US012793996B2

(12) United States Patent
El Batawi

(10) Patent No.: US 12,793,996 B2
(45) Date of Patent: Nov. 10, 2026

(54) METHOD OF MANUFACTURING SOLID OXIDE ELECTROLYZER CELLS USING A CONTINUOUS FURNACE

(71) Applicant: Bloom Energy Corporation, San Jose, CA (US)

(72) Inventor: Emad El Batawi, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 1341 days.

(21) Appl. No.: 17/572,956

(22) Filed: Jan. 11, 2022

(65) Prior Publication Data

US 2022/0231317 A1 Jul. 21, 2022

Related U.S. Application Data

(60) Provisional application No. 63/137,941, filed on Jan. 15, 2021.

(51) Int. Cl.

| | |
|---|---|
| ***C04B 35/64*** | (2006.01) |
| ***B22F 3/105*** | (2006.01) |
| ***C25B 1/04*** | (2021.01) |
| ***H01M 8/1213*** | (2016.01) |
| ***H01M 8/1246*** | (2016.01) |

(Continued)

(52) U.S. Cl.

CPC ........... *H01M 8/1213* (2013.01); *B22F 3/105* (2013.01); *C04B 35/64* (2013.01); *C25B 1/04* (2013.01); *H01M 8/1246* (2013.01); *H01M 8/2432* (2016.02); *B22F 2003/1054* (2013.01); *B22F 2302/25* (2013.01); *C04B 2235/667* (2013.01); *H01M 2008/1293* (2013.01)

(58) Field of Classification Search

CPC ............ C04B 2235/667; C04B 35/653; C04B 2235/661; H01M 8/1246–1273

USPC ................................ 264/606, 652, 605, 671

See application file for complete search history.

(56) References Cited

U.S. PATENT DOCUMENTS

| | | | | |
|---|---|---|---|---|
| 5,529,732 A * | 6/1996 | Ideguchi | F27D 5/00 | 264/630 |
| 5,911,941 A * | 6/1999 | Rokhvarger | G01N 33/388 | 264/606 |
| 8,449,702 B2 | 5/2013 | Batawi et al. | | |

(Continued)

FOREIGN PATENT DOCUMENTS

| | | |
|---|---|---|
| JP | 3364223 B2 | 1/2003 |
| JP | 2007-510255 A | 4/2007 |

(Continued)

OTHER PUBLICATIONS

Shabana P.S. Shaikh et al., "Nanostructured Cu-CGO anodes fabricated using a microwave-assisted glycine-nitrate process", Journal of Physics and Chemistry of Solids, Pergamon Press, London, GB, vol. 98, Jun. 27, 2016, (Jun. 27, 2016), pp. 91-99, XP029699062, ISSN: 0022-3697, DOI: 10.1016/J.JPCS.2016.06.016.

(Continued)

*Primary Examiner* — Erin Snelting

(74) *Attorney, Agent, or Firm* — THE MARBURY LAW GROUP PLLC

(57) ABSTRACT

A method of manufacturing a solid oxide electrolyzer cell (SOEC) includes removing a binder from the SOEC using microwave radiation while the SOEC is disposed in a first zone of a furnace, and sintering the SOEC while the SOEC is disposed in a second zone of the furnace.

19 Claims, 2 Drawing Sheets

(51) Int. Cl.

| | |
|---|---|
| ***H01M 8/2432*** | (2016.01) |
| *H01M 8/12* | (2016.01) |

(56) References Cited

U.S. PATENT DOCUMENTS

| | | | | |
|---|---|---|---|---|
| 8,580,456 | B2 | 11/2013 | Armstrong et al. | |
| 8,940,112 | B2 | 1/2015 | Batawi et al. | |
| 9,882,219 | B2 | 1/2018 | El Batawi et al. | |
| 2005/0089739 | A1 | 4/2005 | Seccombe, Jr. et al. | |
| 2009/0110992 | A1 | 4/2009 | Nguyen | |
| 2011/0183233 | A1 | 7/2011 | Armstrong et al. | |
| 2012/0043010 | A1 | 2/2012 | Batawi et al. | |
| 2012/0244448 | A1* | 9/2012 | Hallum | H01M 8/124<br>204/192.12 |
| 2014/0255599 | A1* | 9/2014 | Delahaye | H01M 4/8621<br>264/618 |
| 2014/0377478 | A1 | 12/2014 | El Batawi et al. | |
| 2016/0351916 | A1 | 12/2016 | Birss et al. | |
| 2018/0243942 | A1* | 8/2018 | Kitaguchi | C04B 38/0006 |
| 2021/0359324 | A1 | 11/2021 | Armstrong | |

FOREIGN PATENT DOCUMENTS

| | | |
|---|---|---|
| JP | 2014-416461 A | 7/2014 |
| JP | 2014518041 | 7/2014 |
| TW | 201251189 A | 12/2012 |

OTHER PUBLICATIONS

Extended European Search Report dated Jun. 9, 2022 for corresponding European Application No. 22151439.1-1108.

Taiwanese Patent Office Communication for ROC (Taiwan) Patent Application No. 111101664, mailed Jun. 3, 2025, with partial English-language translation of the Search Report, 13 pages.

Taiwanese Patent Office Communication for Japanese Patent Application No. 2022-004170, mailed Sep. 9, 2025, 4 pages.

IPO Office Communication, Notice Regarding Rejection Decision for ROC (Taiwan) Patent Application No. 111101664, mailed Jan. 22, 2026, 4 pages.

MOIP Office Communication, Notification of Preliminary Rejection for Korean Patent Application No. 10-2022-0005751, mailed May 9, 2026, 14 pages, including English-language translation.

* cited by examiner

METHOD OF MANUFACTURING SOLID OXIDE ELECTROLYZER CELLS USING A CONTINUOUS FURNACE

PRIORITY

This application is a non-provisional application that claims the benefit of U.S. Provisional Application No. 63/137,941, filed on Jan. 15, 2021, the contents of which are herein incorporated by reference in their entirety.

FIELD

The present embodiments of the present disclosure are directed to methods of manufacturing an electrolyzer cell using a continuous furnace.

BACKGROUND

Solid oxide electrolyzer cells (SOEC) may be used to produce hydrogen. However, SOECs are relatively expensive to manufacture.

SUMMARY

In various embodiments a method of manufacturing a SOEC comprises removing a binder from the SOEC using microwave radiation while the SOEC is disposed in a first zone of a furnace, and sintering the SOEC while the SOEC is disposed in a second zone of the furnace.

FIGURES

DETAILED DESCRIPTION

Solid oxide fuel cells (SOFC) can be operated as SOECs in order to produce hydrogen and oxygen from water using electrolysis. In SOFC mode, oxide ions are transported from the cathode side (air) to the anode side (fuel) and the driving force is the chemical gradient of partial pressure of oxygen across the electrolyte. In SOEC mode, a positive potential (e.g., 1 to 1.5 V) is applied to the air side of the cell and the oxide ions are now transported from the "fuel" (e.g., water) side to the air side. Since the cathode and anode are reversed between SOFC and SOEC (i.e. a SOFC cathode is a SOEC anode, and a SOFC anode is a SOEC cathode), going forward, the SOFC cathode (SOEC anode) will be referred to as the air electrode, and the SOFC anode (SOEC cathode) will be referred to as the fuel electrode.

Figure 1:
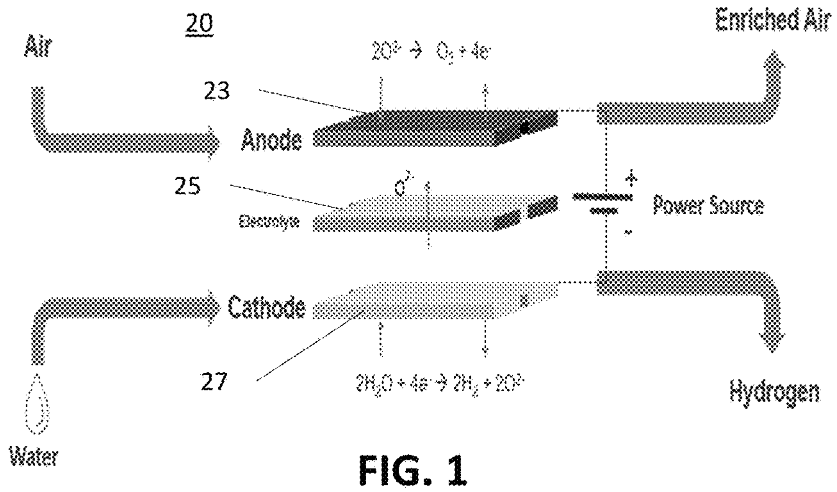
FIG. 1 is a diagram showing the operation of a solid oxide electrolyzer cell, according to various embodiments of the present disclosure.

FIG. 1 is a diagram illustrating the operation of a SOEC 20, according to various embodiments of the present disclosure. Referring to FIG. 1, an air stream is provided to the air electrode 23 while a fuel stream containing water (e.g., a water stream, a mixed water and hydrogen stream, etc.) is provided to the fuel electrode 27. The water is reduced to form $H_2$ gas and $O^{2-}$ ions at the fuel electrode 27 according to the formula: $H_2O+2e^- \rightarrow O^{2-}+H_2$. The $O^{2-}$ ions are transported through the solid oxide electrolyte 25, and then oxidized at the air electrode 23 ($O^{2-}$ to $O_2$) to produce molecular oxygen.

Figure 2A:
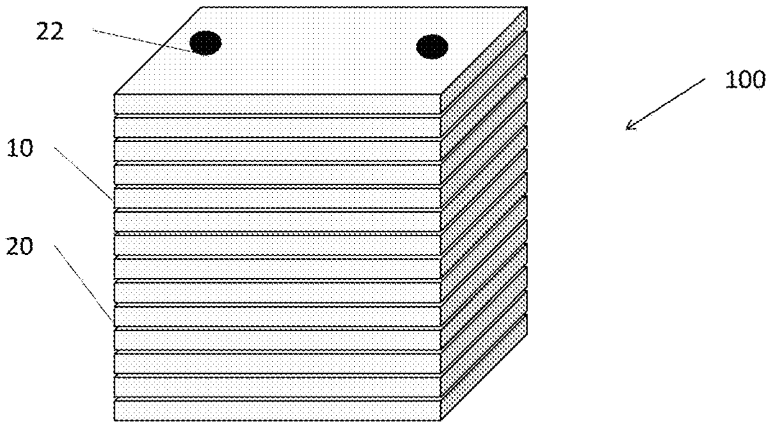
FIG. 2A is a perspective view of a solid oxide electrolyzer cell stack.
Figure 2B:
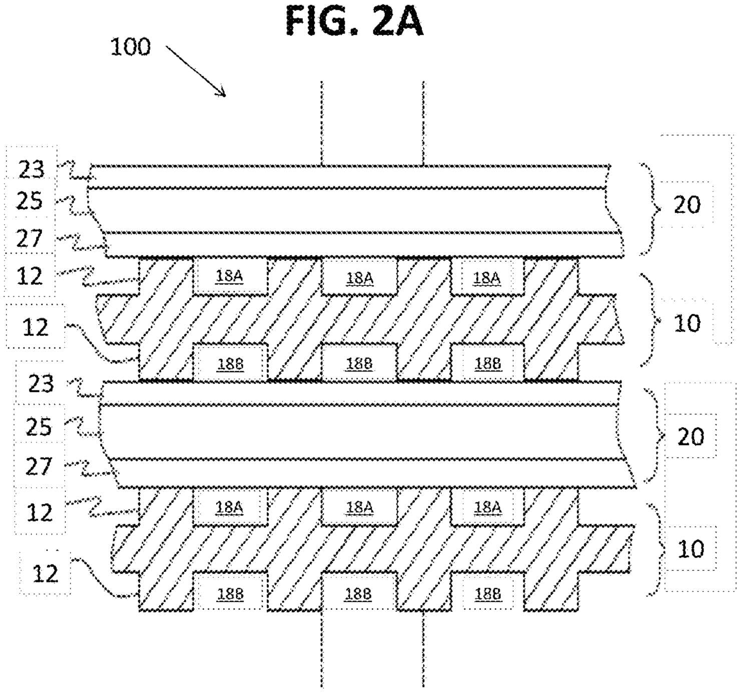
FIG. 2B is a side cross-sectional view of a portion of the stack of FIG. 2A.

FIG. 2A is a perspective view of a solid oxide cell electrolyzer stack 100, and FIG. 2B is a side cross-sectional view of a portion of the stack 100 of FIG. 2A. The term "electrolyzer cell stack," as used herein, means a plurality of stacked electrolyzer cells that can optionally share a common water inlet and exhaust passages or risers. The "electrolyzer cell stack," as used herein, includes a distinct electrical entity which contains two end plates which are connected directly to power conditioning equipment and the power (i.e., electricity) input of the stack or comprises a portion of an electrolyzer cell column that contains terminal plates which provide electrical input.

For example, the stack 100 may include multiple SOECs 20 that are separated by interconnects 10, which may also be referred to as gas flow separator plates or bipolar plates. Each SOEC 20 includes an air electrode 23, a solid oxide electrolyte 25, and a fuel electrode 27. The stack 100 may optionally also include internal fuel (e.g., water) riser channels 22.

The air electrode 23 may comprise an electrically conductive material, such as an electrically conductive perovskite material, such as lanthanum strontium manganite (LSM). Other conductive perovskites, such as lanthanum strontium cobaltite (LSC), lanthanum strontium cobalt manganite (LSCM), lanthanum strontium cobalt ferrite (LSCF), lanthanum strontium ferrite (LSF), $La_{0.85}Sr_{0.15}Cr_{0.9}Ni_{0.1}O_3$ (LSCN), etc., or metals, such as Pt, may also be used. In some embodiments, the air electrode 23 may comprise a mixture of the electrically conductive material and an ionically conductive ceramic material. For example, the air electrode 23 may include from about 10 wt % to about 90 wt % of the electrically conductive material described above, (e.g., LSM, etc.) and from about 10 wt % to about 90 wt % of the ionically conductive material. Suitable ionically conductive materials include zirconia-based and/or ceria based materials. For example, the ionically conductive material may comprise scandia-stabilized zirconia (SSZ), ceria, and at least one of yttria and ytterbia. In some embodiments, the ionically conductive material may be represented by the formula: $(ZrO_2)_{1-w-x-z}(Sc_2O_3)_w(CeO_2)_x(Y_2O_3)_a(Yb_2O_3)_b$, where $0.09 \leq w \leq 0.11$, $0 < x \leq 0.0125$, $a+b=z$, and $0.0025 \leq z \leq 0.0125$. In some embodiments, $0.009 < x \leq 0.011$ and $0.009 \leq z \leq 0.011$, and optionally either a or b may equal to zero if the other one of a or b does not equal to zero.

The electrolyte 25 may comprise a stabilized zirconia, such as scandia stabilized zirconia (SSZ), yttria stabilized zirconia (YSZ) scandia-ceria-stabilized zirconia (SCSZ), scandia-ceria-yttria-stabilized zirconia (SCYSZ), scandia-ceria-ytterbia-stabilized zirconia (SCYbSZ), or the like. For example, the electrolyte 25 may comprise a scandia and ceria stabilized zirconia, comprising 5 to 12 mol % scandia, 1 to 7 mol % ceria, and 80 to 94 mol % zirconia, and optionally 0.5 to 3 mol % ytterbia. Alternatively, the electrolyte 25 may comprise a yttria and ceria stabilized zirconia comprising 3 to 10 mol % yttria, 1 to 6 mol % ceria, and 84 to 96 mol % zirconia. Alternatively, the electrolyte 25 may comprise another ionically conductive material, such as a doped ceria, for example samaria-doped ceria (SDC), gadolinia-doped ceria (GDC), or yttria-doped ceria (YDC).

The fuel electrode 27 may comprise a cermet layer comprising a metal-containing phase and a ceramic phase. The metal-containing phase may include a metal catalyst, such as nickel (Ni), cobalt (Co), copper (Cu), alloys thereof, or the like, which operates as an electron conductor. The metal catalyst may be in a metallic state or may be in an oxide state. For example, the metal catalyst forms a metal oxide when it is in an oxidized state. Thus, the fuel electrode 27 may be annealed in a reducing atmosphere prior to operation of the SOEC, to reduce the oxidized metal catalyst to a metallic state. The ceramic phase of the fuel electrode 37 may include, but is not limited to gadolinia-doped ceria (GDC), samaria-doped ceria (SDC), ytterbia-doped ceria (YDC), scandia-stabilized zirconia (SSZ), ytterbia-ceria-scandia-stabilized zirconia (YbCSSZ), or the like. In the YbCSSZ, scandia may be present in an amount equal to 9 to 11 mol %, such as 10 mol %, ceria may present in amount greater than 0 (e.g., at least 0.5 mol %) and equal to or less than 2.5 mol %, such as 1 mol %, and at least one of yttria and ytterbia may be present in an amount greater than 0 and equal to or less than 2.5 mol %, such as 1 mol %, as disclosed in U.S. Pat. No. 8,580,456, which is incorporated herein, by reference.

Each interconnect 10 electrically connects adjacent SOECs 20 in the stack 100. In particular, an interconnect 10 may electrically connect the air electrode 23 of one SOEC 20 to the fuel electrode 27 of an adjacent SOEC 20. FIG. 1B shows that the lower SOEC 20 is located between two interconnects 10. Each interconnect 10 includes ribs 12 that at least partially define fuel channels 18A and air channels 18B. The interconnect 10 may operate as a reactant separator that separates a first reactant, such as a water containing fuel stream, from a second reactant such as air, which are provided to adjacent SOECs 20. At either end of the stack 100, there may be an air end plate or fuel end plate (not shown) for providing air or fuel, respectively, to the end electrode. Each interconnect 10 may be made of or may contain electrically conductive material, such as a metal alloy (e.g., chromium-iron alloy) which has a similar coefficient of thermal expansion to that of the solid oxide electrolyte 5 (e.g., a difference of 0-10%). For example, the interconnects 10 may comprise a metal (e.g., a chromium-iron alloy, such as 4-6 weight percent iron (e.g., 5 wt % iron), optionally 1 or less weight percent yttrium and balance chromium alloy).

Figure 3:
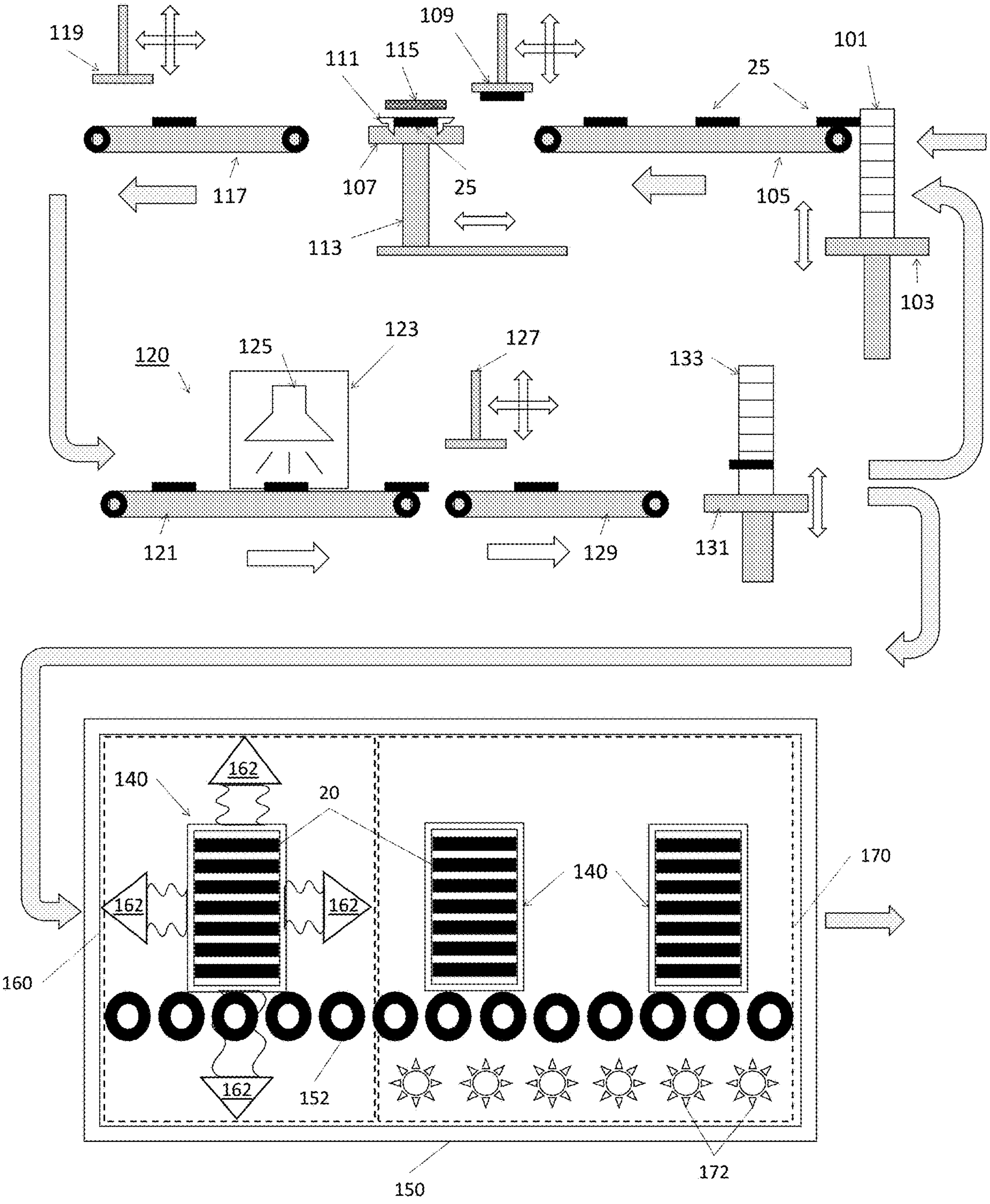
FIG. 3 is a diagram illustrating a method of forming a SOEC, according to various embodiments of the present disclosure.

FIG. 3 is a process diagram showing an exemplary method of making SOECs by screen printing fuel and air electrodes on the electrolyte, drying, and firing. Referring to FIG. 3, bare, plate shaped solid oxide electrolytes 25, such as stabilized zirconia electrolytes are unpackaged and placed into a slotted cassette 101. Each cassette 101 is installed into an elevator 103 which positions the individual electrolytes 25 onto a walking beam conveyor 105. The walking beam conveyor 105 transports the electrolytes 25 to a printing tool plate 107, while exposing the electrolytes 25 to minimal abrasion during the process. A pickup head 109 may be used to place the electrolytes 25 from the end of the walking beam conveyor 105 onto the tool plate 107. The pickup head 109 may be configured with a Bernoulli pad or vacuum pogo pin array to pick up the electrolyte 25.

A screen print cycle begins once the pickup head 109 lowers the electrolyte 25 onto the tool plate 107. First, multiple snugger alignment pins 111 collapse inward toward the electrolyte 25. The pins 111 may be fixed and/or pressure loaded. The combined inward movements position the electrolyte 25 to a predetermined alignment position. A small amount of tool plate 107 vacuum is utilized to keep the electrolyte 25 from oscillating between the alignment pins 111. Once the electrolyte 25 is positioned, a hold down vacuum is applied and the alignment pins 111 retract out and away from the work area. Afterward, the tool plate 107 carriage 113 shuttles below a mesh screen 115 (e.g., a calendared mesh with a high wire density) and the print cycle initiates. The print cycle includes the screen printing process using screen printing suitable ink, such as an ink with a relatively high solids loading of 80 to 93 weight percent, and screen tooling which defines the deposited ink image and ink deposition characteristic. The ink contains an organic binder and electrode active material powder particles in a solvent.

After the electrode screen printing is completed, the printed electrolyte 25 is lifted off the tool plate 107 either manually or by any suitable machine or device, such as a pick up head 109. The tool plate 107 returns to its home position to receive the next electrolyte 25. The previously printed electrolyte 25 is transported down a conveyor 117 to a predetermined pick up location. Another pick up head 119, such as a robotic pick up head, lowers and surrounds the electrolyte 25 with two or more cleats. The cleats do not apply pressure to the substrate in order to minimize chipping or damage to the ink printed electrolyte 25. The pickup head 119 raises and secures the electrolyte 25 with the force of gravity. The pickup head 119 then transports the electrolyte 25 to a dryer belt 121 and releases the electrolyte 25 onto the dryer belt 121.

Any suitable dryer may be used. For example, the dryer 120 may include the dryer conveyor belt 121, such as a woven stainless steel belt or other suitable conveyor belt travelling through an infrared heating zone 123 heated by one or more infrared heating lamps 125. The electrolyte 25 is transported by the belt 121 to the heating zone 123 and heated in the heating zone by the heating lamp(s) 125. During the heating process, a percentage of the ink organics are released from the electrode(s), which prepares the substrate for further processing.

The belt 121 may remain continuously moving while carrying the electrolytes 25 through the heating zone. Alternatively, the belt 121 may transport the electrolyte 25 to the heating zone, then stop while the substrate is being heated, followed by moving the electrolyte 25 out of the heating zone after completion of the heating.

If desired, the dryer may comprise two or more belts and/or two or more heating zones. In case of two or more belts 121, the pickup head 119 may be pre-programmed or controlled by an operator or control system to sequentially place the substrates on different belts to dry the substrates in parallel rather than in series. The drying steps may be conducted at a temperature of less than 150° C., such as 50 to 100° C., for example 70 to 80° C.

The dried printed electrolyte 25 is then removed from the dryer 120 ether manually or by machine. Any suitable machine may be used. For example, a robotic Bernoulli pad or vacuum pickup head 127 with configured pogo pins may be positioned near the dryer exit. The pad or head removes the electrolyte 25 from the dryer belt and places it on a walking beam conveyor 129. The walking beam conveyor 129 transports the substrate to an exit elevator 131, which then loads the electrolyte 25 into a cassette for subsequent processing.

In particular, the above processes may be repeated to apply additional electrode ink layers to the same sides of the electrolytes 25, and/or to print one or more electrode ink layers on opposing sides of the electrolytes 25, in order to form the SOEC 20. In various embodiments, different electrode inks may be applied to each side of the electrolytes 25 and/or to the same sides of the electrolytes 25, in order to form the SOEC.

Conventionally, electrolytes printed with one or more electrode inks are thermally processed in a batch furnace to remove (e.g., burnout) ink binders and sinter the ink printed on the electrolytes into an electrode. However, conventional binder burnout processes may require long thermal processing times, in order to avoid electrode delamination, and may require mechanical electrolyte containment, in order to prevent excessive electrolyte warping. The equipment needed to constrain electrolytes may also increase the thermal mass of the process, which also increases processing time and reduces process throughput.

After sintering is complete, conventional batch furnaces are cooled before a new batch of electrolytes can be processed, which also extends processing time and increases energy costs. Further, conventional electrical batch furnaces are also vulnerable to heating element failure, which may results in the scraping of an entire furnace load of electrolytes and significant cost increases.

In view of the above and/or other drawbacks of conventional methods, various embodiments provide an improved method of binder removal and electrode sintering using microwave heating. The electrolyte 25 may be subjected to microwave heating with one dried electrode ink (e.g., fuel or air electrode ink) layer printed on one side of the electrolyte 25, or with two dried electrode ink (e.g., both fuel and air electrode inks) printed on respective, opposing sides of the electrolyte 25.

In particular, after electrode ink printing on one or both sides of the electrolyte 25 is complete, the SOECs 20 may be loaded into a ceramic frame or support 140. In particular, the support 140 may include one or more rails or rings that support the periphery of each SOEC 20, such that the dried electrode inks are exposed (e.g., do not contact adjacent SOECs 20).

The support 140 may be loaded into a continuous furnace 150, such as a continuous pusher or roller hearth kiln or the like. The furnace 150 may include ceramic rollers 152 that are driven to move the supports 140 through the furnace 150, at a continuous or a variable rate. The furnace 150 may include at least one microwave generator 162 and at least one additional heating element 172. The furnace 150 may be divided into a first zone 160 and a second zone 170. The furnace 150 may be configured to maintain a selected atmosphere and/or temperature within the first zone 160 and/or the second zone 170. For example, the furnace 150 may be configured to maintain an internal atmosphere having a selected oxygen partial pressure.

In operation, supports 140 loaded with the SOECs 20 (e.g., the printed electrolytes 25) may be provided to the first zone 160 for binder removal (e.g., burnout). In particular, the microwave generator 162 may include one or more microwave sources configured to radiate microwaves to the SOECs 20, as the support 140 moves through the first zone 160. The microwave generator 162 may be configured to heat the SOECs 20 to a sufficient temperature in order to drive out (e.g., volatize) binders from the electrode inks printed thereon. For example, the SOECs 20 may be debindered at a temperature greater than 300° C., such as a temperature ranging from about 400° C. to about 800° C. In some embodiments, the first zone 160 may be heated by heat generated in the second zone 170, in order to increase the rate of binder burnout. As such, the binder removal process may be referred to as a microwave-assisted binder burnout process.

After binder removal, the support 140 may be moved into the second zone 170. The second zone 170 may be heated by the heating element 172. In some embodiments, the heating element 172 may include one or more gas heating elements (e.g., gas-fired burners). However, in other embodiments, the heating element 172 may optionally include one or more resistive heating elements. The gas heating elements may be disposed in a separate chamber of the furnace, such that combustion gasses do not affect the internal atmosphere of the furnace 150. For example, hot combustion gasses may be routed around the second zone 170, in order to heat sidewalls of the furnace 150, and thereby indirectly heat the electrolytes 25.

The second zone 170 may be maintained at a temperature sufficient to sinter the SOECs 20, as the SOECs 20 pass through the second zone 170. In other words, the ceramic or cermet electrodes (23 and/or 27) are sintered to the electrolyte 25. For example, the SOECs 20 may be sintered at a temperature greater than 1000° C., such as a temperature ranging from about 1100° C. to about 1400° C.

After sintering, the supports 140 may be removed from the furnace 150 and allowed to cool. After cooling, sintered SOECs 20 may be removed from the supports 140.

According to various embodiments, the disclosed continuous binder burnout and sintering processes may result in unexpected cost reductions, as compared to conventional batch processing. For example, manufacturing output of SOECs may be increased by a factor of 4, or more, at the same or similar operating costs as conventional batch processing. For example, the continuous furnaces used in the present embodiments may have a smaller cross-section, as compared to conventional batch furnaces, which reduces thermal mass and the associated energy consumption costs. In addition, the continuous furnaces of the present embodiments may provide significantly lower failure rates, since resistive heating elements are not required to endure thermal cycling. Finally, utilizing a continuous furnace may also provide a lower overall maintenance costs.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. A method of manufacturing a solid oxide electrolysis cell (SOEC), comprising:
- inserting the SOEC into a first zone of a furnace;
- removing a binder from the SOEC using microwave radiation by continuously moving the SOEC through the first zone of a furnace and into a second zone of the furnace, while the first zone is held at a first temperature; and
- sintering the SOEC using at least one heating element while continuously moving the SOEC through the second zone of the furnace, while the second zone is held at a second temperature,
- wherein the furnace comprises at least one microwave source disposed in the first zone and the at least one heating element is disposed in the second zone.

2. The method of claim 1, wherein the furnace is a continuous pusher or roller hearth kiln.

3. The method of claim 1, wherein:
- the inserting comprises loading multiple SOECs on a ceramic support and inserting the ceramic support into the first zone; and
- the removing a binder comprises removing the binder from the multiple SOECs loaded on the ceramic support using the microwave radiation while the ceramic support continuously moves through the first zone of the furnace.

4. The method of claim 3, wherein the sintering comprises sintering the multiple SOECs loaded on the ceramic support while the ceramic support moves through the second zone of the furnace.

5. The method of claim 1, wherein the removing the binder comprises removing the binder from an electrode ink coated on one side of a solid oxide electrolyte of the SOEC.

6. The method of claim 1, wherein the removing the binder comprises removing the binder from respective first and second electrode inks coated on opposing first and second sides of a solid oxide electrolyte of the SOEC.

7. The method of claim 6, further comprising:

printing the first electrode ink on the first side of the solid oxide electrolyte;

drying the first electrode ink;

printing the second electrode ink on the second side of the electrolyte;

drying the second electrode ink to form the SOEC;

inserting the SOEC into the first zone of the furnace after drying the first and the second electrode inks; and cooling the SOEC outside of the furnace.

8. The method of claim 1, wherein the first zone comprises multiple microwave sources configured to generate the microwave radiation.

9. The method of claim 1, wherein the at least one heating element comprises at least one gas heating element.

10. The method of claim 1, wherein the SOEC continuously moves through the first zone and the second zone at a constant rate.

11. The method of claim 1, wherein the SOEC passes through the first and second zones without exiting the furnace.

12. The method of claim 1, wherein the first temperature is a temperature ranging from 400° C. to 800° C.

13. The method of claim 12, wherein the second temperature is a temperature ranging from 1100° C. to 1400° C.

14. The method of claim 1, wherein the sintering sinters at least one electrode of the SOEC to a solid oxide electrolyte of the SOEC.

15. The method of claim 14, wherein the solid oxide electrolyte comprises a stabilized zirconia or a doped ceria material.

16. The method of claim 15, wherein the at least one electrode comprises an air electrode comprising an electrically conductive perovskite material.

17. The method of claim 16, wherein the air electrode comprises a mixture of the electrically conductive perovskite material and an ionically conductive ceramic material.

18. The method of claim 15, wherein the at least one electrode comprises a fuel electrode comprising a cermet material.

19. The method of claim 1, wherein:

the removing a binder comprises removing the binder from the SOEC using only the at least one microwave source; and the sintering the SOEC comprises using only heat generated by the at least one heating element.

* * * * *